United States Patent [19]

Commander

[11] Patent Number: 4,746,485
[45] Date of Patent: May 24, 1988

[54] ROTATING SHIELDED CRANE SYSTEM

[75] Inventor: John C. Commander, Idaho Falls, Id.

[73] Assignee: The United States of America as represented by the United States Department of Energy, Washington, D.C.

[21] Appl. No.: 932,078

[22] Filed: Nov. 19, 1986

[51] Int. Cl.⁴ .................... G21C 13/00; G21C 19/00
[52] U.S. Cl. .................... 376/206; 376/340; 376/460; 212/209
[58] Field of Search ............ 376/206, 205, 460, 264, 376/262, 146, 341, 340, 260, 261; 212/209, 224, 205

[56] References Cited

U.S. PATENT DOCUMENTS

| | | | |
|---|---|---|---|
| 3,271,262 | 9/1966 | Hutchinson et al. | 376/460 |
| 3,308,030 | 3/1967 | Aizu et al. | 376/341 |
| 3,437,558 | 4/1969 | Gunson et al. | 376/264 |
| 3,883,012 | 5/1975 | Jones | 376/264 |
| 4,113,558 | 9/1978 | Wade | 376/460 |
| 4,341,732 | 7/1982 | Sharbaugh et al. | 376/206 |
| 4,618,472 | 10/1986 | Gjertsen et al. | 376/446 |
| 4,664,873 | 5/1987 | Hendrich et al. | 376/260 |

FOREIGN PATENT DOCUMENTS

| | | | |
|---|---|---|---|
| 0029781 | 6/1981 | European Pat. Off. | 376/205 |
| 0001789 | 1/1978 | Japan | 376/206 |
| 0018489 | 1/1984 | Japan | 376/206 |

Primary Examiner—Deborah L. Kyle
Assistant Examiner—Daniel Wasil
Attorney, Agent, or Firm—Gustavo Siller, Jr.; Paul A. Gottlieb; Judson R. Hightower

[57] ABSTRACT

A rotating, radiation shielded crane system for use in a high radiation test cell, comprises a radiation shielding wall, a cylindrical ceiling made of radiation shielding material and a rotatable crane disposed above the ceiling. The ceiling rests on an annular ledge intrgrally attached to the inner surface of the shielding wall. Removable plugs in the ceiling provide access for the crane from the top of the ceiling into the test cell. A seal is provided at the interface between the inner surface of the shielding wall and the ceiling.

20 Claims, 3 Drawing Sheets

ROTATING SHIELDED CRANE SYSTEM

CONTRACTUAL ORIGIN OF THE INVENTION

The United States Government has rights to this invention under Contract DE-AC07-76ID01570 between EG&G Idaho, Inc. and the United States Department of Energy.

BACKGROUND OF THE INVENTION

This invention relates generally to a crane system, and more particularly, to a rotating, radiation shielded crane system.

For the next phase of the United States Fusion Program, a compact high-field, toroidal ignition machine, designated the Compact Ignition Tokomak (CIT) is proposed. The CIT machine will be housed in a test cell which must be designed to provide shielding from the ionizing radiation resulting from the CIT full power pulses. The CIT will be fueled by Deuterium-Tritium (D-T). During operation, it will generate high-energy neutrons and may release tritium to the test cell atmosphere. After tritium operation begins, the machine will quickly become activated to a radiation level that will prevent personnel access to the test cell. Maintenance requirements necessitate a crane system which has access to the CIT machine and its ancilliary equipment.

Conventional tests cell/crane designs include a crane system which is housed in the test cell itself. A crane system having maximum reach capabilities, as the one disclosed in U.S. Pat. No. 3,770,137 may be used in this design.

Such a design, however, has several disadvantages. The test cell must have a larger overhead capacity to accommodate the crane system. Neutron activation of the crane will complicate maintenance procedures for the crane itself. If the crane becomes activated, the crane must be transferred to either a hot cell or a warm cell for maintenance. The warm cell is used only if hands-on work can be performed under controlled conditions; the hot cell is used for completely remote work. To prevent activation of the crane, it must be positioned away from the CIT machine during machine operation, thereby requiring a larger floor space for the test cell. Further, the crane must be positioned at a distance sufficient to insure that the magnetic materials in the crane will not interfere with the CIT field magnets.

From an economic viewpoint, there will be larger construction costs associated with a larger test cell. Since there will be no radiation shielding close to the machine, the air in the test cell will become activated during a pulse. A larger test cell means that a larger volume of the test cell itself is subject to tritium contamination and that a larger volume of air will be subject to activation. The activated air must be held in a radiation-shielded holdup vessel for a sufficient time to assure that the activation is reduced to a safe level for release to the atmosphere. Nitrogen-13, a positron emitter with a half-life of 10 minutes, will be at a level of about $2 \times 10^6$ pCi/cc (too high for release directly to the environment). Holding up the air for nine half-lives of nitrogen-13 (90 min.) will reduce the activation to a safe level for release. The most direct method for holdup of test cell air is to use the test cell itself as the radiation-shielded holdup vessel. Therefore, for safety reasons, the test cell design must also provide seals against leaks of tritium and activated air from the test cell.

Therefore, in view of the above, it is an object of the present invention to provide a crane system for use in high radiation test environment which will be shielded from radiation and tritium exposure.

It is a further object of the present invention to provide a shielded crane system which has maximized reach capabilities inside the test cell.

It is a further object of the present invention to provide a crane system which will minimize the amount of electromagnetic interference between the CIT machine and the crane.

It is a further object of the present invention to provide a test cell crane system which will minimize the volume of test cell subject to tritium contamination and minimize the volume of air subject to activation.

It is still a further object of the present invention to provide a test cell crane shield system which will provide for tritium and activated air containment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purposes of the present invention, as embodied and broadly described herein, the radiation shielded crane system of this invention may comprise a cylindrical, radiation-shielding wall, a rotatable, cylindrical, ceiling made of radiation shielding material and a polar crane disposed above the ceiling. The ceiling rest on an annular ledge which is integrally attached to the inside surface of the shielding wall. Means are provided in the ceiling for accessing the inside of the test cell from the top of the ceiling. Seals for containing tritium and activated air in the test cell are provided at the interface between the inner surface of the shielding wall and the ceiling.

DETAILED DESCRIPTION OF THE INVENTION

Reference will now be made in detail to the present preferred embodiments of the invention, an example of which is illustrated in the accompanying drawings.

Figure 1:
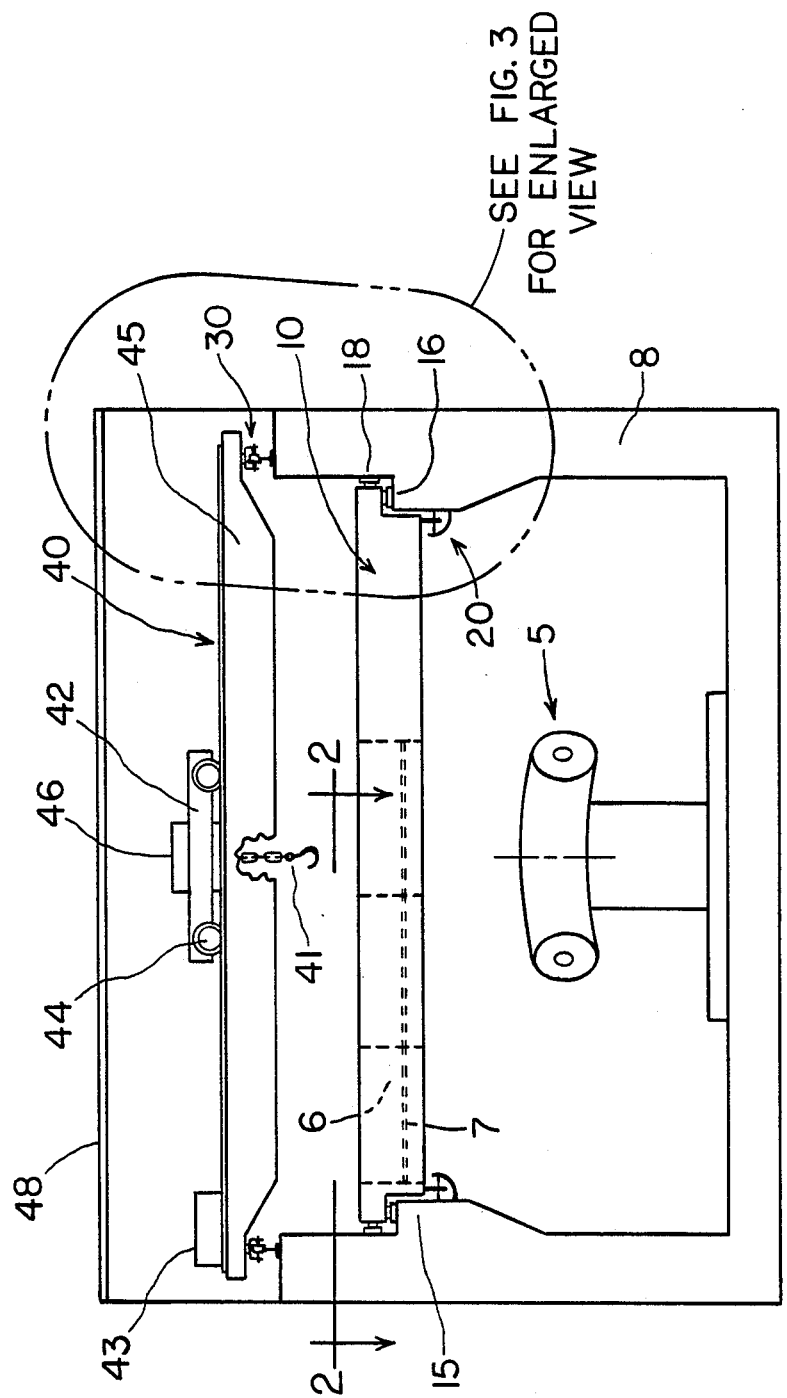
FIG. 1 is an elevational view of the rotating, shielded crane system of the present invention.

Referring to FIG. 1, toroidal plasma confinement device 5 is enclosed in cylindrical, radiation-shielding wall 8. Evaluation of various test cell configurations indicate that the circular cross-section of cylindrical radiation-shielding wall 8 satisifies many of the functional and operational requirements, while also providing economic advantages. A cylindrically-shaped test cell offers equidistant access from the shield wall to the plasma confinement device 5 for diagnostics, radio frequency waveguides, field coil power leads, and other length-sensitive systems. A rectangular or square configured test cell does not offer these advantages and is estimated to have a 25% to 50% higher construction cost.

The top of cylindrical shielding wall 8 forms an annular ledge on which polar crane 40 rests. Preferably, polar crane 40 comprises a beam 45, which bridges across shielding wall 8; a trolley 42, which travels on beam 45; and friction reducing means 30. As illustrated in more detail in FIG. 3, friction reducing means 30 may comprise a rail 32 which rest on top of shielding wall 8 and rollers or wheels 34 which are operably attached to beam 45 and travel on rail 32. The top of beam 45 forms a rail track on which the rollers 44 of trolley 42 run. Driving means 46 is provided for moving the trolley 42 across beam 45. Driving means 43 is provided for rotating the beam 45 on rail 32.

Test cell shield ceiling 10 rests on an annular ledge 15, which is integrally attached to the inner surface of shielding wall 8. In a prefered arrangement conical roller bearings 16 are disposed between annular ledge 15 and shielded ceiling 10, allowing for polar rotation of the ceiling. Vertical access type roller bearings 18 are positioned between the vertical portion of shield ceiling 10 and the inner surface of shielding wall 8, thereby providing horizontal thrust loading to the test cell wall.

Rotational drive for ceiling 10 is provided by electric motor 38 and a ring 37 and pinion gear 36 system.

Figure 2:
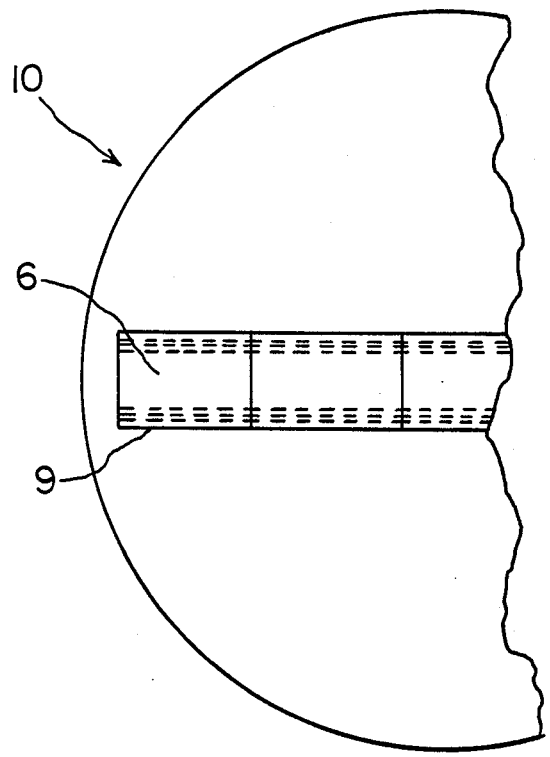
FIG. 2 is a segmental top view of the rotating roof through lines 2—2 of FIG. 1.

Referring to FIG. 2, access to the test cell below the shield ceiling 10 is provided by removal of shield plugs 6 providing a radial slot in the shield ceiling. The slot allows the crane hoisting tackle 41 to be lowered into the test cell. Removable shield plugs 6 will use o-ring compression seals 7 at horizontal surfaces and will use inflatable seals 9 at vertical gaps.

The arrangement of shield ceiling 10 below the polar crane 40 provides a design that will allow overhead polar crane 40 to operate independently of the shield ceiling. To lift something in the test cell, crane 40 will first remove a radial plug 6 from shield ceiling 10, producing a radial slot in the shield. Crane 40 will then rotate and place plug 6 on top of shield ceiling 10. The crane and slot will then be alligned and locked into synchronous movement. The crane and shield ceiling may be locked into synchronous movement by operating the driving means for each respective element through a computerized control system. The crane hook 41 may then be lowered through the slot. The whole assembly will rotate together during the lifting operation. In this way, polar crane 40 can achieve hook coverage to any location within the volume of the test cell below. At the end of the lift, plug 6 will be placed back into the slot. Roof 48 covering the crane is provided for weather protection only, and will not be shielded or tritium sealed.

A seal 20 is provided at the gap between shield ceiling 10 and test cell wall 8. Seal 20 protects against leakage of tritium or activated air from the test cell. In a prefered embodiment, seal 20 comprises an annular trough 22 integrally attached to the inner surface of shield wall 8. An annular rim 26 protrudes from the bottom of shield ceiling 10 and into trough 22. Water 24 is disposed in trough 22 at a level which is higher than the bottom of rim 26. This arrangement provides a continuous water seal around the test cell perimeter. It will be readily appreciated by those skilled in the art that trough 22 may be filled with any suitable liquid.

Figure 3:
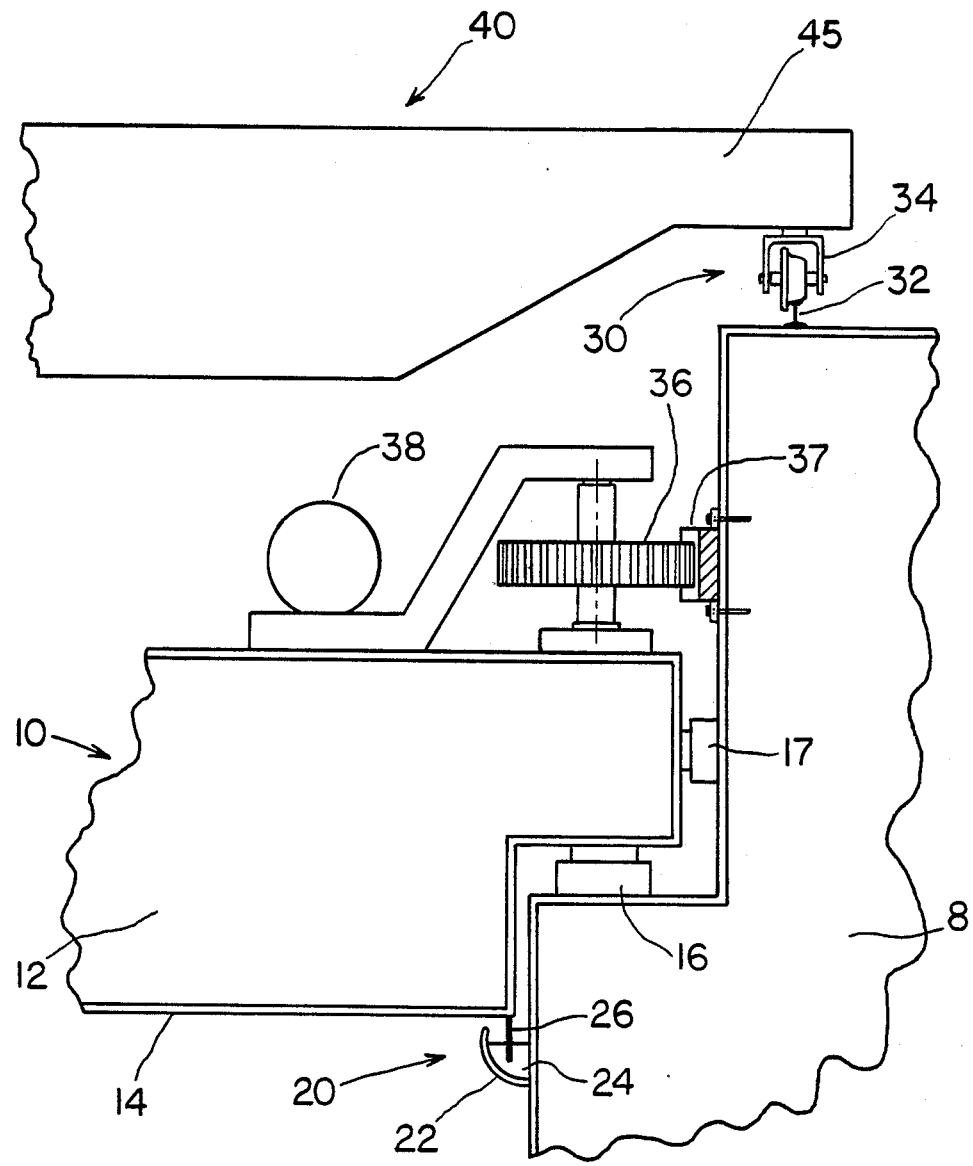
FIG. 3 is an enlarged view of detail A in FIG. 1.

Any suitable radiation shielding material may be used for test cell wall 8 and shield ceiling 10. In a prefered embodiment shield ceiling 10 is comprised of a concrete base 12 enveloped in a stainless steal sheath 14, as depicted in FIG. 3. Shielding wall 8 is comprised of concrete.

The disclosed arrangement has the advantage that the crane will be shielded from neutrons and separated by seals from tritium during machine operations. The crane will therefore not become activated, and hands-on maintenance can be accomplished at any time during machine downtime. Additionally, eliminating the head room required by a crane under the shielding reduces the height of the heavy concrete sidewall 8 and further reduces the volume of test-cell air that will become activated. Magnetic materials of the polar crane will be a sufficient distance from the field magnets of the toroidal plasma confinement device to prevent electromagnetic interference between the crane and the confinement device's magnets.

The foregoing description of the preferred embodiments of the invention have been presented for purposes of illustration and description. They are not intended to be exhaustive or to limit the invention to precise forms disclosed, and obviously many modifications and variations are possible in light of the above teaching. The embodiments were chosen and described in order to better explain the principle of the invention and its practical application to thereby enable others skilled in the art to best utilize the invention in various embodiments and with other modifications as are suited to the particular use contemplated. It is intended that the scope of the invention be defined by the claims appended hereto.

The embodiments of this invention in which an exclusive property or privilege is claimed are defined as follows:

1. A rotating, radiation-shielded crane system comprising:
   a generally cylindrical, radiation-shielding wall, the top of said wall forming a first annular ledge;
   a second annular ledge integrally attached to the inner surface of said shielding wall;
   a generally cylindrical ceiling made of radiation shielding material, said ceiling including a flange portion on the top thereof and a body portion, said flange portion associated with said second annular ledge such that said ceiling is supported thereby, the volume inside said wall and said ceiling forming a test cell;
   a rotatable crane disposed above said ceiling such that said crane is outside of said test cell;
   removable access means in said ceiling for allowing said crane to access the inside of said test cell from the top of said ceiling;
   means for sealing the interface between the inner surface of said shielding wall and said ceiling.

2. The crane system of claim 1 further including: first friction reducing means disposed between said second annular ledge and said flange portion of said ceiling; and driving means for rotating said ceiling.

3. The crane system of claim 2 wherein said ceiling includes a radial slot therethrough and wherein said removable access means comprises:
   a removable radial plug disposed in said radial slot; and
   means for sealing the interface between said plug and said removable access slot in said ceiling.

4. The crane system of claim 3 wherein said rotatable crane comprises:
   second friction reducing means disposed atop said first annular ledge;

a beam bridging across said shielding wall, the ends of said beam lying on said second friction reducing means and said beam forming a rail track;

a trolley, the rollers of said trolley running on said rail track;

driving means for moving said trolley across said rail track; and driving means for rotating said beam on said second friction reducing means.

5. The crane system of claim 4 wherein said second friction reducing means comprises:

a generally circular rail lying on said first annular ledge; and roller means for traveling on said rail operably attached to said beam.

6. The crane system of claim 5 wherein said first friction reducing means are roller bearings.

7. The crane systems of claim 6 wherein said means for sealing the interface between said plug and said ceiling comprises o-rings, said o-rings being positioned such that a compression seal is formed between the surfaces of said interface.

8. The crane system of claim 7 further comprising horizontal thrust bearings operatively positioned between the outer periphery of the flange of said ceiling and said shielding wall.

9. The crane system of claim 8 wherein said driving means for rotating said ceiling comprises:

a ring gear attached to the inner surface of said shielding wall;

a motor; and a pinion gear drive operatively attached between said motor and said ring gear.

10. The crane system of claim 9 further comprising means for locking said ceiling and said rotatable crane into synchronous movement.

11. The crane system of claim 2 wherein said means for sealing the interface between the inner surface of said shielding wall and said ceiling comprises:

a generally annular trough integrally attached to the inner surface of said shielding wall;

an annular rim protruding from the bottom of said ceiling and extending into said trough; and a liquid disposed in said trough, the level of said liquid being above the bottom edge of said annular rim.

12. A rotating radiation-shielding crane system comprising:

a generally cylindrical radiation-shielding wall, the top of said wall forming a first annular ledge;

a second annular ledge integrally attached to the inner surface of said shielding wall;

first friction reducing means disposed atop said second annular ledge;

a generally cylindrical ceiling made of radiation shielding material, said ceiling including a flange portion on the top thereof and a body portion, said flange portion lying on said first friction reducing means and said ceiling having a radial slot extending from the center thereof, the volume inside said wall and said ceiling forming a test cell;

a removable radial plug disposed in said radial slot;

means for sealing the interface between the inner surface of said shielding wall and said ceiling;

driving means for rotating said ceiling; and a rotatable crane disposed above said ceiling such that said crane is outside said test cell.

13. The crane system of claim 12 wherein said first friction reducing means are roller bearings.

14. The crane system of claim 13 wherein said roller bearings are conical roller bearings.

15. The crane system of claim 14 wherein said rotatable crane comprises:

second friction reducing means disposed atop said first annular ledge;

a beam bridging across said shielding wall, the ends of said beam lying on said second friction reducing means and said beam forming a rail track;

a trolley, the rollers of said trolley running on said rail track;

driving means for moving said trolley across said rail track; and driving means for rotating said beam on said second friction reducing means.

16. The crane system of claim 15 wherein said second friction reducing means comprises:

a generally circular rail lying on said first annular ledge; and roller means operatively attached to said beam for traveling on said rail.

17. The crane system of claim 16 wherein said means for sealing the interface between the inner surface of said shielding wall and said ceiling comprises:

a generally annular trough integrally attached to the inner surface of said shielding wall;

an annular rim protruding from the bottom of said ceiling and extending into said trough; and a liquid disposed in said trough, the level of said liquid being above the bottom edge of said rim.

18. The crane system of claim 17 further comprising a plurality of horizontal thrust bearings operatively positioned between the outer periphery of the flange of said ceiling and said shielding wall.

19. The crane system of claim 18 wherein said driving means for rotating said ceiling comprises:

a ring gear attached to the inner surface of said shielding wall;

a motor; and a pinion gear drive operatively attached between said motor and said ring gear.

20. A high radiation test cell and crane system comprising:

a generally cylindrical wall made of radiation shielding material, the top of said wall forming a first annular ledge;

a second annular ledge integrally attached to the inner surface of said wall;

roller bearings disposed atop said second annular ledge;

a generally cylindrical ceiling made of radiaiton shielding material, said ceiling including a flange portion on the top thereof and a body portion, said flange portion lying on said roller bearings, said ceiling having a radial slot extending from the center thereof and said ceiling having an annular rim protruding from the bottom thereof, the volume inside said wall and said ceiling forming a test cell;

a removable radial plug disposed in said radial slot;

a generally annular trough integrally attached to the inner surface of said cylindrical wall, said rim extending into said trough;

a liquid disposed in said trough, the level of said liquid being above the bottom edge of said rim;

means for sealing the interface between said plug and said slot in said ceiling;

driving means for rotating said ceiling; and a rotatable crane disposed above said ceiling such that said crane is outside said test cell.

* * * * *